(12) United States Patent
Walther et al.

(10) Patent No.: US 11,895,130 B2
(45) Date of Patent: *Feb. 6, 2024

(54) PROACTIVE SUSPICIOUS ACTIVITY MONITORING FOR A SOFTWARE APPLICATION FRAMEWORK

(71) Applicants: ATLASSIAN PTY LTD., Sydney (AU); ATLASSIAN, INC., San Francisco, CA (US)

(72) Inventors: Benjamin Walther, Mountain View, CA (US); Brianna Malcolmson, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,767

(22) Filed: Sep. 16, 2022

(65) Prior Publication Data
US 2023/0097884 A1 Mar. 30, 2023

Related U.S. Application Data

(63) Continuation of application No. 17/490,930, filed on Sep. 30, 2021, now Pat. No. 11,483,322.

(51) Int. Cl.
*G06F 21/55* (2013.01)
*H04L 9/40* (2022.01)

(52) U.S. Cl.
CPC ........ *H04L 63/1416* (2013.01); *G06F 21/552* (2013.01); *G06F 2221/2101* (2013.01)

(58) Field of Classification Search
CPC .................................................. H04L 63/1416
USPC ........................................................... 726/23
See application file for complete search history.

(56) References Cited

U.S. PATENT DOCUMENTS

| 10,397,258 B2 * | 8/2019 | Luo ......................... G06F 21/55 |
| 10,904,289 B2 * | 1/2021 | Tsironis .................. H04L 63/20 |
| 11,153,333 B1 * | 10/2021 | Hermoni ............. H04L 41/0622 |

(Continued)

*Primary Examiner* — Badrinarayanan
*Assistant Examiner* — Badri Champakesan
(74) *Attorney, Agent, or Firm* — ALSTON & BIRD LLP

(57) ABSTRACT

Various embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using an interactive software application platform monitoring dashboard comprises a set of user interfaces (e.g., an alert feed user interface, an alert monitoring user interface, and/or the like) that enable an end user to hierarchically view event monitoring metadata fields associated with each recorded suspicious activity alert of one or more recorded suspicious activity alerts of the software application platform, provide user-selected alert validity indicators for each recorded suspicious activity alert of the recorded suspicious activity alerts, and/or generate a suspicious activity monitoring workflow for each recorded suspicious activity alert of the recorded suspicious activity alerts.

17 Claims, 11 Drawing Sheets

(56) References Cited

U.S. PATENT DOCUMENTS

| | | | |
|---|---|---|---|
| 2012/0240185 A1* | 9/2012 | Kapoor | G06F 16/2358 726/1 |
| 2014/0067734 A1* | 3/2014 | Hawkins | G06N 20/00 706/58 |
| 2018/0068219 A1* | 3/2018 | Turner | G06N 20/00 |
| 2018/0173579 A1* | 6/2018 | Potlapally | G06F 11/3006 |
| 2018/0309822 A1* | 10/2018 | Baradaran | H04L 41/0893 |
| 2020/0259852 A1* | 8/2020 | Wolff | G06F 21/566 |
| 2020/0285737 A1* | 9/2020 | Kraus | G06F 21/554 |
| 2021/0029137 A1* | 1/2021 | Wright | H04L 63/08 |
| 2021/0092141 A1* | 3/2021 | Gamble | H04L 63/1433 |
| 2021/0182388 A1* | 6/2021 | Myneni | G06N 20/00 |
| 2021/0250369 A1* | 8/2021 | Åvist | H04L 63/1408 |
| 2021/0360015 A1* | 11/2021 | Mammadli | H04L 63/145 |

* cited by examiner

600

601 duration       : 46479.279999971
602 first_seen    : 01/04/2021 09:17:07.432000000
603 last_seen     : 01/04/2021 22:11:46.712000000
    searches      : 10.192.37.186,
                    10.192.87.196,
                    admin admin,
                    admin/admin,
                    default creds,
                    apidocs/ password,
                    jenkins,
           604    jenkins admin,
                    password admin,
                    password password,
                    s3 secret,
                    username: admin
605 weight        : 4

FIG. 6

ALERT DASHBOARD

RIVIAN ORGANIZATION

← BACK TO ORGANIZATION

- DASHBOARD
- ALERTS
- REPORTS
- OPEN INVESTIGATIONS
- SEARCH
- SUPPRESS ALERTS

TABLE

TEXT 731  🔍  ALERT NAME ⌄  STATUS ⌄
           732              733

| ☆ | ALERT NAME 711 | DESCRIPTION 712 | STATUS 713 | HANDLER | CREATED DATE 714 | ACTIONS 722 |
|---|---|---|---|---|---|---|
| ☆ | ⊙ ANOMALOUS JIRA LOGIN | LOGIN FROM UNKNOWN IP | IN PROGRESS | ○ BRIANNA | 2020-05-17 | ⋮ |
| ☆ | ⊙ SUSPICIOUS SEARCH | MULTIPLE SEARCHES FOR SENSITIVE INFORMATION... | NEW | ○ JOANNE | 2020-05-17 | ⋮ |
| ☆ | ⊙ JIRA ISSUE MADE PUBLIC | PRIVATE ISSUE SHARED WITH EXTERNAL PARTY | NEW | ○ DONNE | 2020-05-17 | ⋮ |
| ☆ | ⊙ SSH KEY UPLOADED | SSH KEY UPLOADED AS ATTACHMENT ON INSTAN... | NEW | ○ DALE | 2020-05-17 | ⋮ |
| ☆ | ⊙ EXPORTED SPACE ALERT | USER EXPORTED LARGE NUMBER OF PAGES IN SO... | CLOSED | ○ ALYCE | 2020-05-17 | ⋮ |

☐ ALERT-150

SUSPICIOUS SEARCH 812 814
⌖ ATTACH  ⛶ ADD A CHILD ISSUE | START INCIDENT › | ⋯

STATUS 714
[ TO DO › ]

DESCRIPTION 712
MULTIPLE SEARCHES FOR SENSITIVE INFORMATION WERE DETECTED IN YOUR CONFLUENCE INSTANCE; RIVAIAN INTERNAL
801
ACCOUNT NAME: NOTREDTEAM
USUAL ACTIVITY:
 20 SEARCHES PER DAY, .5% SENSITIVE KEYWORDS
ANOMALOUS ACTIVITY:
802 50 SEARCHES IN 20 MINUTES 100% SENSITIVE KEYWORDS 803

ACTIVITY COMMENTS ✓

☺  [ ADD A COMMENT...  811 ]
PRO TIP: PRESS M TO COMMENT

ASSIGNEE
☺ BRIANNA 805

ALERT ACCURACY
TRUE POSITIVE 851
FALSE POSITIVE 852
PRIORITY
« MEDIUM 806

TIME TRACKING
⏱ 1H LOGGED  2H REMAINING  804
ORIGINAL ESTIMATE
NONE

FIG. 8

PROACTIVE SUSPICIOUS ACTIVITY MONITORING FOR A SOFTWARE APPLICATION FRAMEWORK

CROSS-REFERENCE TO RELATED APPLICATIONS

This application is a continuation of and claims priority to U.S. application Ser. No. 17/490,930, titled "PROACTIVE SUSPICIOUS ACTIVITY MONITORING FOR A SOFTWARE APPLICATION FRAMEWORK" and filed Sep. 30, 2021, the contents of which are hereby incorporated by reference in its entirety.

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using an interactive software application platform monitoring dashboard comprises a set of user interfaces (e.g., an alert feed user interface, an alert monitoring user interface, and/or the like) that enable an end user to hierarchically view event monitoring metadata fields associated with each recorded suspicious activity alert of one or more recorded suspicious activity alerts of the software application platform, provide user-selected alert validity indicators for each recorded suspicious activity alert of the recorded suspicious activity alerts, and/or generate a suspicious activity monitoring workflow for each recorded suspicious activity alert of the recorded suspicious activity alerts.

In accordance with one aspect, a computer-implemented method is provided. In one embodiment, the computer-implemented method comprises: identifying a user-selected suspicious activity alert for the software application framework; generating alert monitoring user interface data for an alert monitoring user interface that is associated with the user-selected suspicious activity alert, wherein the alert monitoring user interface is configured to display one or more event monitoring metadata fields associated with the user-selected suspicious activity alert and enable user selection of a user-selected alert validity indicator for the user-selected suspicious activity alert, and wherein the alert monitoring user interface is configured to be displayed to an end user of a computing device; and storing event validity association data describing an association of the one or more event monitoring metadata fields and the user-selected suspicious activity alert in a storage framework, wherein the event validity association data is configured to be used to train one or more proactive suspicious activity monitoring predictive data analysis models associated with the software application framework.

In accordance with another aspect, a computer program product is provided. The computer program product may comprise at least one computer-readable storage medium having computer-readable program code portions stored therein, the computer-readable program code portions comprising executable portions configured to: identify a user-selected suspicious activity alert for the software application framework; generate alert monitoring user interface data for an alert monitoring user interface that is associated with the user-selected suspicious activity alert, wherein the alert monitoring user interface is configured to display one or more event monitoring metadata fields associated with the user-selected suspicious activity alert and enable user selection of a user-selected alert validity indicator for the user-selected suspicious activity alert, and wherein the alert monitoring user interface is configured to be displayed to an end user of a computing device; and store event validity association data describing an association of the one or more event monitoring metadata fields and the user-selected suspicious activity alert in a storage framework, wherein the event validity association data is configured to be used to train one or more proactive suspicious activity monitoring predictive data analysis models associated with the software application framework.

In accordance with yet another aspect, an apparatus comprising at least one processor and at least one memory including computer program code is provided. In one embodiment, the at least one memory and the computer program code may be configured to, with the processor, cause the apparatus to: identify a user-selected suspicious activity alert for the software application framework; generate alert monitoring user interface data for an alert monitoring user interface that is associated with the user-selected suspicious activity alert, wherein the alert monitoring user interface is configured to display one or more event monitoring metadata fields associated with the user-selected suspicious activity alert and enable user selection of a user-selected alert validity indicator for the user-selected suspicious activity alert, and wherein the alert monitoring user interface is configured to be displayed to an end user of a computing device; and store event validity association data describing an association of the one or more event monitoring metadata fields and the user-selected suspicious activity alert in a storage framework, wherein the event validity association data is configured to be used to train one or more proactive suspicious activity monitoring predictive data analysis models associated with the software application framework.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 6 provides an operational example of a recorded activity event in accordance with at least some embodiments of the present invention.

FIG. 7 provides an operational example of an alert feed user interface in accordance with at least some embodiments of the present invention.

FIG. 8 provides an operational example of an alert monitoring user interface in accordance with at least some embodiments of the present invention.

Figure 9:
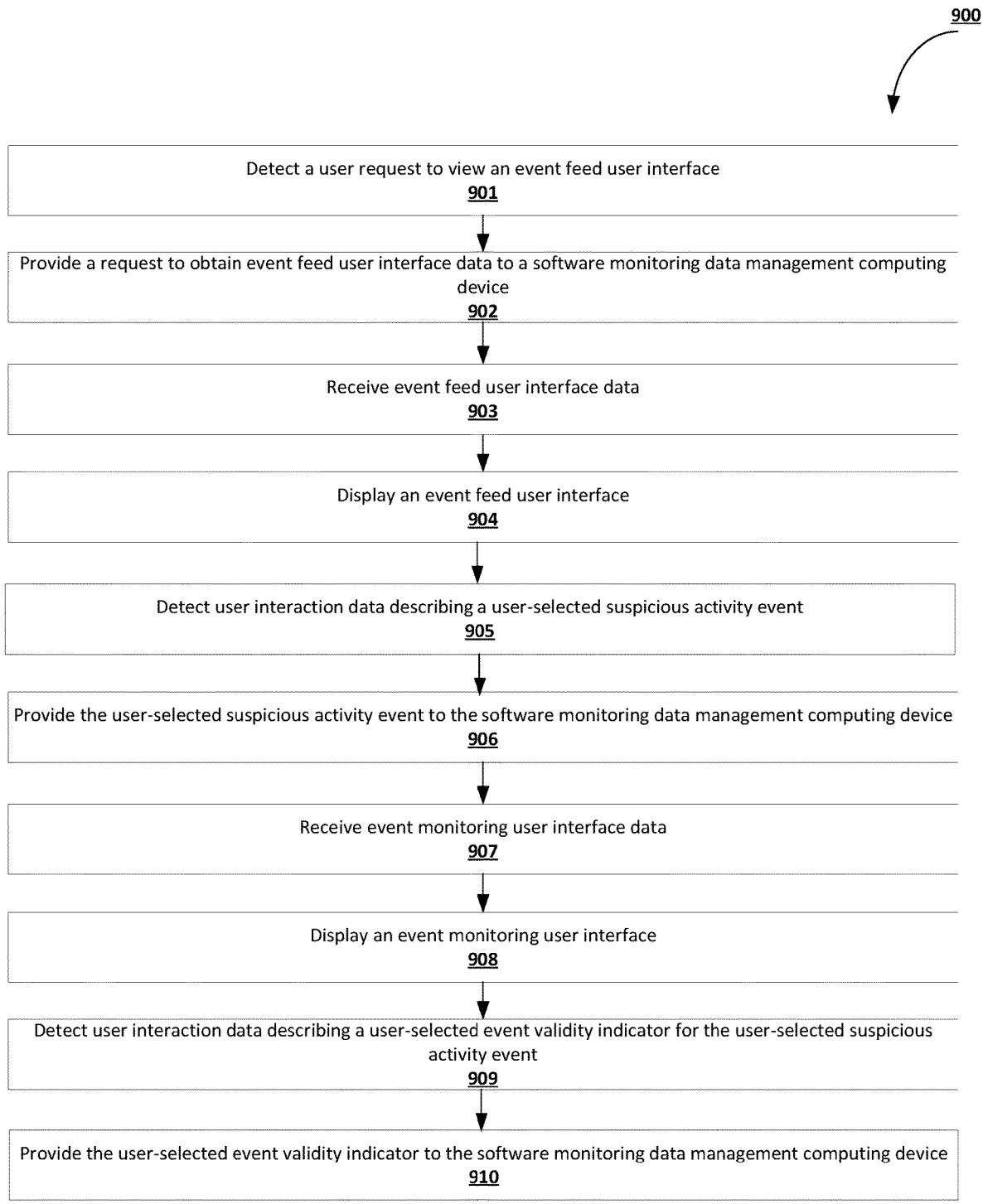

FIG. 9 is a flowchart diagram of an example process for performing client-side operations for proactive suspicious activity monitoring for a software application platform using an interactive software application platform monitoring dashboard in accordance with at least some embodiments of the present invention.

Figure 10:
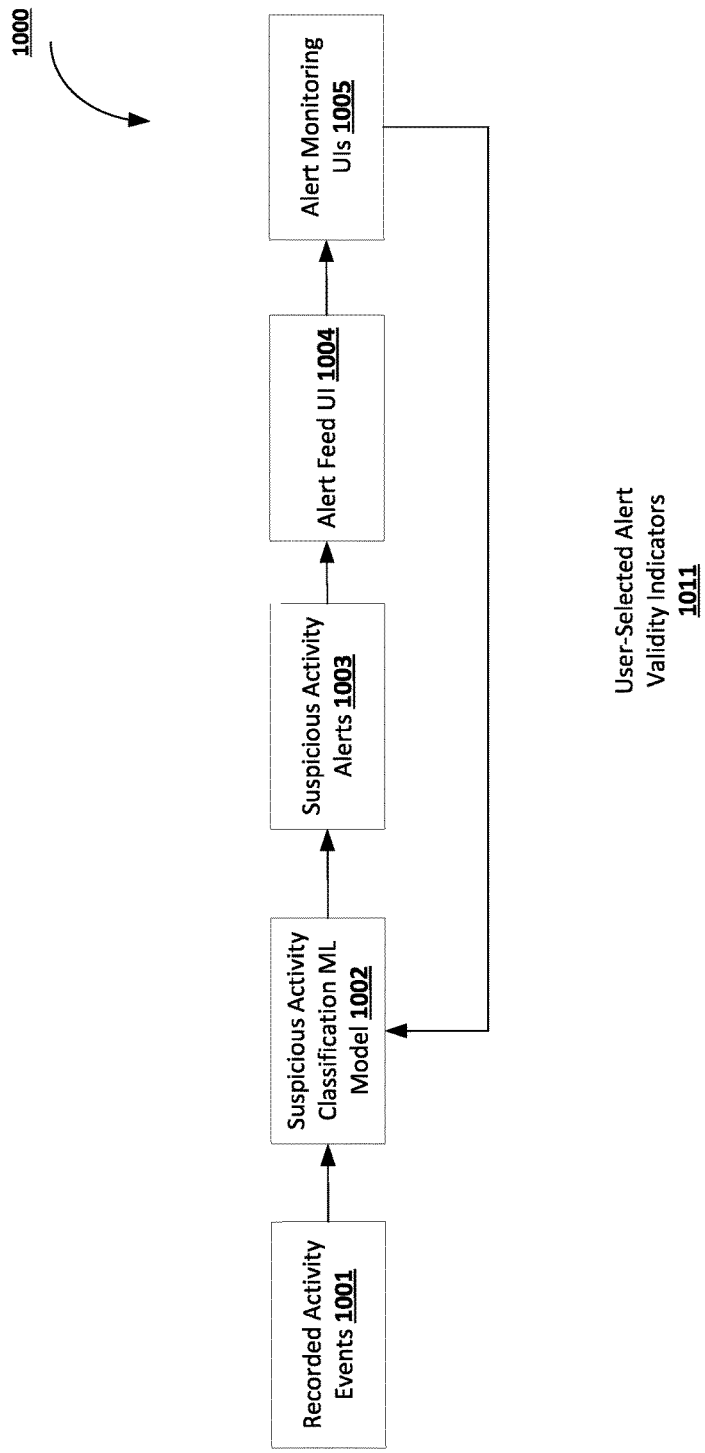

FIG. 10 is a data flow diagram of an example process for generating and maintaining a suspicious activity classification machine learning model in accordance with at least some embodiments of the present invention.

Figure 11:
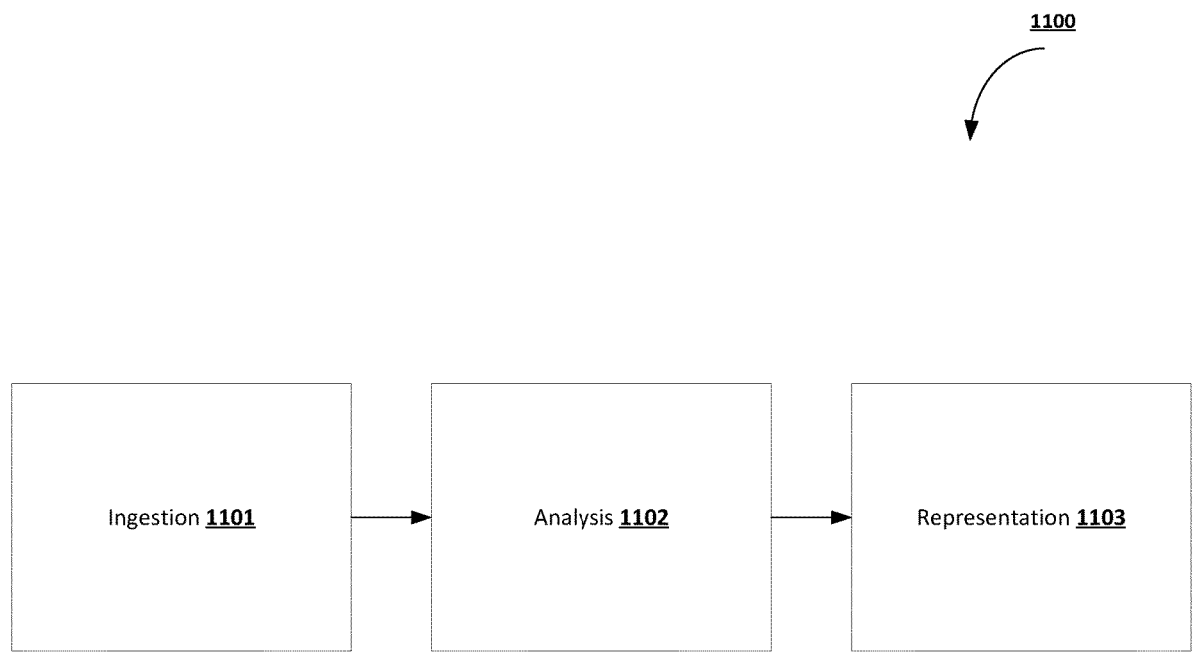

FIG. 11 is a data flow diagram of an example process for identifying one or more recorded activity events for a software application framework and processing the one or more recorded activity events to generate one or more suspicious activity alerts in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing proactive monitoring of complex software application frameworks. The disclosed techniques can be utilized by a software monitoring data management system to generate predictive insights that enhance effectiveness and efficiency of performing software application framework monitoring with respect to complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at individual levels, team levels, and enterprise levels.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Individual software applications or software services may be configured to generate suspicious activity alerts that describe a maintenance-critical state and/or security-critical state of the software applications or software services. Because of the numerosity of the software applications/services that are hosted by a complex software application framework, a large number of suspicious activity alerts may be generated at any selected time interval. This creates a need for determining which suspicious activity alerts should be operationally prioritized, which suspicious activity alerts should be operationally deprioritized, and which suspicious activity alerts should be regarded as false positives.

Various embodiments of the present invention address the problems/needs discussed above. For example, in some embodiments, an interactive software application platform monitoring dashboard enables an end user of a software monitoring data management system 101 to view top-level metadata about suspicious activity alerts using an alert feed user interface that enables user selection of a suspicious activity alert, and view holistic metadata about suspicious activity alerts using an alert monitoring user interface for the user-selected suspicious activity alert. This alone enables the end user to efficiently prioritize subsets of suspicious activity alerts using the alert feed user interface without the need to interact with detailed metadata associated with each suspicious activity alert, which may in some embodiments only be viewed after user selection of a suspicious activity alert via the user feed user interface.

As another example, in some embodiments, an alert monitoring user interface for a user-selected suspicious activity enables a user to provide of a user-selected alert validity indicator for the user-selected suspicious activity alert, where the user-selected alert validity indicator is stored to be used to train one or more proactive suspicious activity monitoring predictive data analysis models associated with the software application framework. Currently, existing predictive data analysis models are often ill-fitted to detect rarer types of suspicious activity alerts. Accordingly, a need exists for both refining suspicious activity alerts to reduce their number which would also serve to operationally prioritize some suspicious activity alerts over other suspicious activity alerts. To address that need, various embodiments of the present invention enable end users to provide additional training data for proactive suspicious activity monitoring predictive data analysis models using user-selected alert validity indicators, a feature that enables generating more reliable and more predictively accurate proactive suspicious activity monitoring predictive data analysis models to ensure that a higher ratio of suspicious activity alerts are properly classified to enhance event refinement and event operational prioritization/de-prioritization.

Accordingly, as described above, by proposing solutions for determining which suspicious activity alerts should be operationally prioritized, which suspicious activity alerts should be operationally deprioritized, and which suspicious activity alerts should be regarded as false positives, various embodiments of the present invention address technical problems associated with efficiently and reliably performing proactive monitoring of complex software application frameworks. In doing so, various embodiments of the present invention make important technical contributions to the fields of complex software application framework maintenance and complex software application framework security.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the software monitoring data management computing device 106 of FIG. 1. In some embodiments, a server computing device communicates with one or more client computing devices using one or more computer networks.

The term "recorded activity event" is a data construct that is generated by a software application monitoring computing device via monitoring user-provided activity requests provided to a software application platform. The recorded activity event is transmitted by a software application monitoring computing device to a software monitoring data management computing device. The recorded activity event describes one or more event monitoring metadata fields associated with a recorded platform activity pattern that was recorded to have been performed by the software application platform in response to one or more activity requests by an end user while interacting with the software application platform. Examples of event monitoring metadata fields for a recorded activity event that is associated with a recorded platform activity pattern include an event monitoring metadata field describing a duration of the recorded platform activity pattern, an event monitoring metadata field describing a time of an initial detection of the recorded platform activity pattern, an event monitoring metadata field describing a time of a final/last detection of the recorded platform activity pattern, an event monitoring metadata field describing one or more user-provided input values that were provided by the end user to the software application framework as part of the activity requests by the end user, and an inferred suspicious activity likelihood weight for the recorded platform activity pattern that describes an inferred/computed likelihood that the recorded platform activity pattern is suspicious and/or is maintenance-critical (e.g., is security-critical). For example, when a recorded activity event describes a sensitive keyword search recorded platform activity pattern comprising one or more recorded keyword searches for sensitive keywords that are performed by a common user account, the event monitoring metadata fields for the noted recorded activity event may describe at least one of a duration of time within which the recorded keyword searches were performed, a recorded time of an initial recorded keyword search of the noted recorded keyword searches, a recorded time of a final recorded keyword search of the noted recorded keyword searches, the sensitive keywords, and the inferred suspicious activity likelihood weight for the noted recorded keyword searches.

The term "suspicious activity alert" is a recorded activity event that is designated/recorded to be describing/indicating a suspicious platform activity pattern, i.e., a platform activity pattern that was deemed maintenance-critical and/or security-critical for the software application platform. In some embodiments, all of the recorded activity patterns received from a software application monitoring computing device for a software application platform are deemed maintenance-critical and/or security-critical for the software application platform. In some embodiments, each recorded activity pattern is associated with an event monitoring metadata field that describes an inferred suspicious activity likelihood weight for the platform activity pattern that is associated with the recorded activity pattern. In some of the noted embodiments, a recorded activity pattern is deemed maintenance-critical and/or security-critical if the noted event monitoring metadata field (i.e., the event monitoring metadata field that describes inferred suspicious activity likelihood weight for the platform activity pattern that is associated with the recorded activity pattern) satisfies (e.g., exceeds) a suspicious activity likelihood weight threshold value. In some embodiments, a recorded activity event is deemed to be a suspicious activity alert if a model output of a suspicious activity classification machine learning model that is generated via processing features associated with the recorded activity event describe that the recorded activity event is a suspicious activity alert.

The term "suspicious activity classification machine learning model" is a data construct that is generated by a software monitoring data management computing device and maintained by the a software monitoring data management computing device in a storage subsystem of a software monitoring data management system that is associated with the software monitoring data management computing device. The data construct may describe parameters, hyperparameters, and/or defined operations of a trained machine learning model that is configured to generate a model output via processing features relating to an input recorded activity event, where the model output can be used to infer/compute whether the input recorded activity event should be deemed a suspicious recorded activity event. In some embodiments, the features relating to an input recorded activity event that are provided as part of an input to a suspicious activity classification machine learning model include features extracted from the event monitoring metadata fields of the input recorded activity event, such as features provided by generating keyword embeddings for keywords described by the event monitoring metadata fields of an input recorded activity event that describes a sensitive keyword search activity pattern comprising one or more recorded keyword searches for sensitive keywords that are performed by a common user account, features provided by generating time encodings of duration, initial detection time, and/or final detection time features of an input recorded activity event, and/or the like. In some embodiments, the model output of the suspicious activity classification machine learning model is determined based on an inferred suspicious activity likelihood weight for the platform activity pattern that is associated with the recorded activity which describes a likelihood that the platform activity pattern is suspicious. In some embodiments, the model output of the suspicious activity classification machine learning model is determined based on an indication of whether an inferred suspicious activity likelihood weight for the platform activity pattern that is associated with the recorded activity pattern satisfies (e.g., exceeds) a suspicious activity likelihood weight threshold value. In some embodiments, a suspicious activity classification machine learning model is a trained recurrent neural network machine learning model (e.g., a trained long-short term memory machine learning model) that is configured to process extracted features from sequentially-recorded activity requests of a common user profile with respect to a software application platform using a sequence of processing time steps for the trained recurrent neural network machine learning model. In some of the noted embodiments, each processing timestep generates a hidden state that can be used by a subsequent machine learning model (e.g., a set of fully connected layers) to determine whether the activity request associated with the processing timestep is part of an activity pattern having a particular activity type.

The term "activity type" is a data construct that is generated by a software monitoring data management computing device and maintained by the a software monitoring data management computing device in a storage subsystem of a software monitoring data management system that is associated with the software monitoring data management computing device as part of the metadata for a corresponding recorded activity event. The activity type of a recorded activity pattern describes a desired/expected output of the platform activity pattern that is associated with the recorded activity pattern. For example, a recorded activity pattern that includes one or more keyword searches that is each configured to retrieve search results for an input keyword (i.e., a suspicious keyword search activity event) may be associated with a suspicious keyword search activity event type. As another example, a recorded activity pattern that includes receiving one or more spam emails from the same recipient profile and/or within a defined time window having a defined time window size (i.e., a spam email receipt activity event) may be associated with a spam email receipt activity event type. In some embodiments, a suspicious activity classification machine learning model is configured to generate an activity type for each recorded suspicious activity alert. For example, the suspicious activity classification machine learning model may be configured to generate n inferred suspicious activity likelihood weights for a recorded activity event, where each inferred suspicious activity likelihood weight describes a likelihood that the recorded activity event is associated with an activity type of n activity types.

The term "alert feed user interface" may refer to a user interface that is presented by a client computing device to an end user of the client computing device based on alert feed user interface data generated by a software monitoring data management computing device and provided by the software monitoring data management computing device to the client computing device. The alert feed user interface describes a set of suspicious activity alerts that are associated with the software application platform in a temporally-ordered manner, along with a top-level subset of the event metadata fields for each suspicious activity alert. In some embodiments, the alert feed user interface is configured to present, for each suspicious activity alert having a set of event metadata fields, only those event metadata fields that are deemed to be hierarchically superior to other event metadata fields of the suspicious activity alert. In some embodiments, the software monitoring data management computing device generates alert feed user interface data (e.g., HTML, data) for the alert feed user interface and provides the alert feed user interface data to a client computing device, where the client computing device is configured to generate the alert feed user interface based on the alert feed user interface data and present/display the alert feed user interface to an end user of the client computing device.

The term "event monitoring metadata field" may refer to a data construct that is generated by a software monitoring data management computing device and maintained by the a software monitoring data management computing device in a storage subsystem of a software monitoring data management system that is associated with the software monitoring data management computing device as part of the metadata for a corresponding suspicious activity alert. An event monitoring metadata field of a corresponding suspicious activity alert describes one or more features of the corresponding suspicious activity alert that are configured to be displayed by an interactive software application platform monitoring dashboard that comprises a set of user interfaces (e.g., an alert feed user interface, an alert monitoring user interface, and/or the like) that enable an end user to hierarchically view event monitoring metadata fields associated with each recorded suspicious activity alert of one or more recorded suspicious activity alerts of the software application platform and provide user-selected alert validity indicators for each recorded suspicious activity alert of the recorded suspicious activity alerts. In some embodiments, event monitoring metadata fields for a suspicious activity alert include a set of top-level event monitoring metadata fields that are designated by system configuration data for a software monitoring data management system that comprises the software monitoring data management computing device to be semantically more pertinent to identification of the suspicious activity alert, as well as a set of bottom-level event monitoring metadata fields that are designated by the system configuration data for the software monitoring data management system to be semantically less pertinent to identification of the suspicious activity alert compared to the noted top-level event monitoring metadata fields. Examples of top-level event monitoring metadata fields for a suspicious activity alert include metadata fields that describe at least one of an activity type for the suspicious activity alert, a textual description for the suspicious activity alert, a user-selected status classification for the suspicious activity alert, an administrator user profile that is assigned to the suspicious activity alert, and a creation date of the suspicious activity alert. Examples of low-level event monitoring metadata fields for a suspicious activity alert include metadata fields that describe at least one of a computed/inferred remaining time measure for addressing the suspicious activity alert, a computed/inferred priority level for the suspicious activity alert, one or more classification explanatory features, and/or the like.

The term "alert monitoring user interface" may refer to a user interface that is presented by a client computing device to an end user of the client computing device based on alert monitoring user interface data generated by a software monitoring data management computing device and provided by the software monitoring data management computing device to the client computing device. An alert monitoring user interface displays a set of event monitoring metadata fields for a user-selected suspicious activity alert that include at least one bottom-level event monitoring metadata fields for the user-selected suspicious activity alert. In some embodiments, the alert monitoring user interface is configured to display one or more event monitoring metadata fields associated with the user-selected suspicious activity alert and enable user selection of a user-selected alert validity indicator for the user-selected suspicious activity alert. In some embodiments, the software monitoring data management computing device generates alert feed user interface data (e.g., HTML, data) for the alert monitoring user interface and provides the alert monitoring user interface data to a client computing device, where the client computing device is configured to generate the alert monitoring user interface based on the alert monitoring user interface data and present/display the alert monitoring user interface to an end user of the client computing device. In some embodiments, an alert monitoring user interface is associated with a user-selected suspicious activity alert that is selected via user interaction with an alert feed user interface. An alert feed user interface can be used by an end user of a client computing device to select a user-selected suspicious activity alert via interacting (e.g., clicking on, touching on, and/or the like) the depicted indication of a particular suspicious activity alert as depicted by the alert feed user interface. In some embodiments, the user-selected suspicious activity alert is selected by the end user from a plurality of recorded suspicious activity alerts, and identifying the user-selected suspicious activity alert comprises generating alert monitoring user interface data for an event feedback user interface that is configured to display the plurality of recorded suspicious activity alerts and enable the end user to select the user-selected suspicious activity alert from the plurality of recorded suspicious activity alerts.

The term "recorded activity performance frequency" may refer to a data construct that is generated by a software monitoring data management computing device and maintained by the a software monitoring data management computing device in a storage subsystem of a software monitoring data management system that is associated with the software monitoring data management computing device as part of the metadata for a corresponding suspicious activity alert. The recorded activity performance frequency may describe a count and/or a per-time-unit (e.g., a per-minute) count of detection of activity requests associated with the corresponding suspicious activity pattern within a designated time period (e.g., a period within which the activity requests were detected, a defined time window such as two-hour time window, and/or the like).

The term "recorded activity performance ratio" may refer to a data construct that is generated by a software monitoring data management computing device and maintained by the a software monitoring data management computing device in a storage subsystem of a software monitoring data management system that is associated with the software monitoring data management computing device as part of the metadata for a corresponding suspicious activity alert. The recorded activity performance may describe a ratio of suspicious activity patterns within all of the recorded activity patterns having a particular activity type. For example, the recorded activity performance may describe how many percentage of keyword searches by a particular user profile within a designated time period used suspicious keywords, how many percentage of emails received from a particular recipient profile within a designated time period were predicted/indicated by the user to be spam emails, and/or the like.

The term "classification explanatory feature" may refer to a data construct that is generated by a software monitoring data management computing device and maintained by the a software monitoring data management computing device in a storage subsystem of a software monitoring data management system that is associated with the software monitoring data management computing device as part of the metadata for a corresponding suspicious activity alert. A classification explanatory feature may be any feature that is designated/recorded as being significant to a classification of a suspicious activity alert as being maintenance-critical and/or security-critical. In some embodiments, when classification of a recorded activity event as being maintenance-critical and/or security-critical is performed by a the suspicious activity classification machine learning model based on one or more event features of the recorded activity event, the classification explanatory feature include those features that have a parameter value assigned to them by the suspicious activity classification machine learning model (e.g., by an input layer of the suspicious activity classification machine learning model) that satisfies (e.g., exceeds) a parameter value threshold for the suspicious activity classification machine learning model. In some embodiments, each recorded suspicious activity alert is associated with one or more classification explanatory features that are determined based on one or more model parameters of the suspicious activity classification machine learning model, and the one or more metadata fields for the user-selected suspicious activity alert comprise the one or more classification explanatory features for the user-selected suspicious activity alert. Examples of one or more classification explanatory features are features that describe at least one of recorded activity performance frequencies and recorded activity performance ratios for suspicious activity alerts.

The term "user-selected alert validity indicator" may refer to a data construct that is generated by a software monitoring data management computing device and maintained by the a software monitoring data management computing device in a storage subsystem of a software monitoring data management system that is associated with the software monitoring data management computing device as part of the metadata for a corresponding suspicious activity alert. A user-selected alert validity indicator describes a user-selected value that may serve as a ground-truth measure of whether the end user regards a suspicious activity alert as being properly categorized as being maintenance-critical and/or security-critical. In some embodiments, an alert monitoring user interface is configured to display one or more event metadata fields associated with the user-selected suspicious activity alert and enable user selection of a user-selected alert validity indicator for the user-selected suspicious activity alert. In some embodiments, the user-selected alert validity indicators for suspicious activity alerts can be used by a training engine to further train one or more proactive suspicious activity monitoring predictive data analysis models (e.g., the suspicious activity classification machine learning model).

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
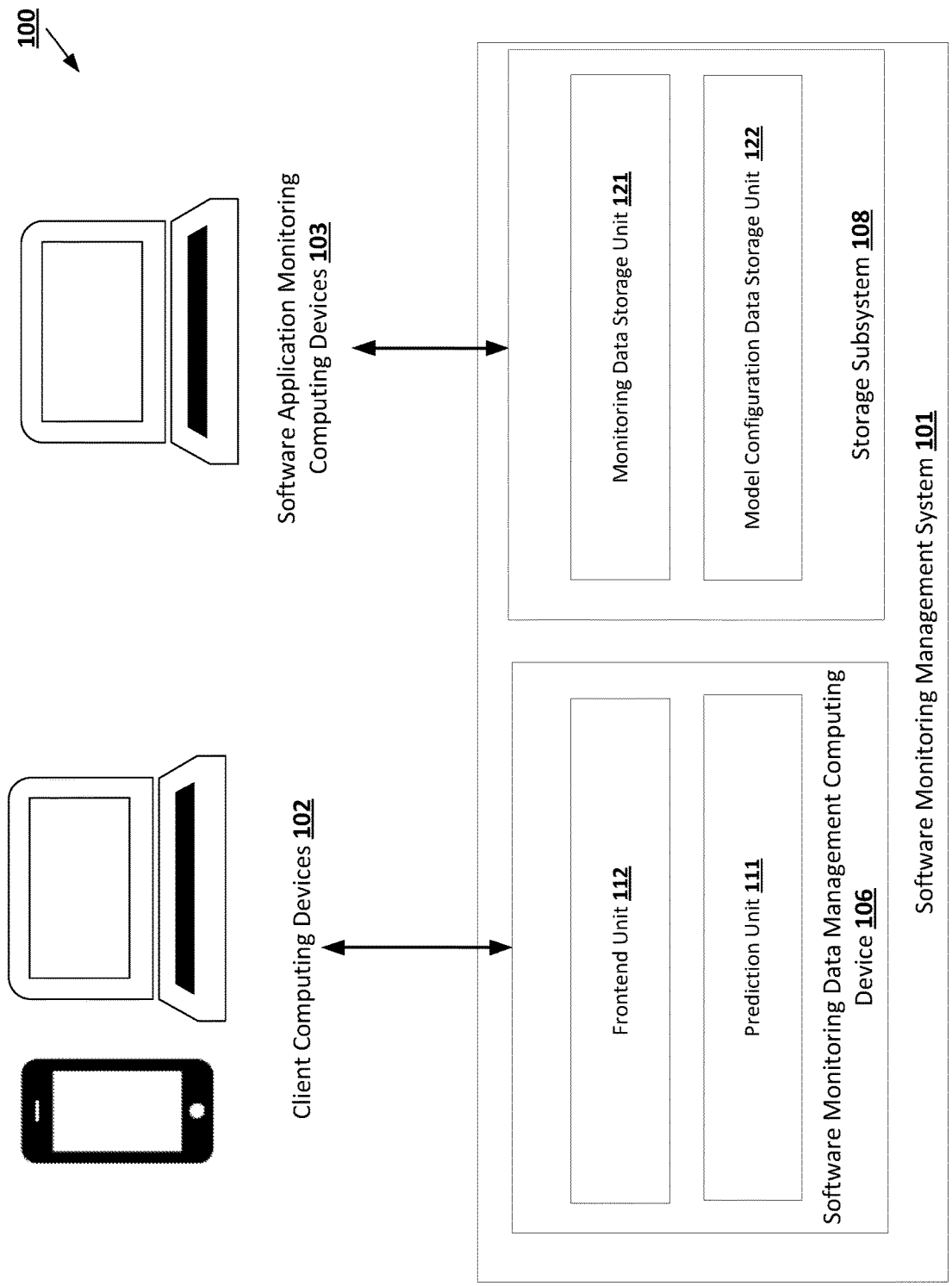
FIG. 1 is a block diagram of an example architecture within which at least some embodiments of the present invention may operate.

FIG. 1 depicts an exemplary architecture 100 for performing proactive suspicious activity monitoring of a software application framework that is associated with one or more software application monitoring computing devices 103. The architecture 100 includes one or more client computing devices 102, a software monitoring data management system 101, and one or more software application monitoring computing devices 103.

The one or more software application monitoring computing devices 103 are configured to transmit suspicious activity alerts to the software monitoring data management system 101, which the software monitoring data management system 101 may store in the monitoring data storage unit 121 in the storage subsystem 108 of the software monitoring data management system 101. The software monitoring data management computing device 106 may process the suspicious activity alerts that are stored in the monitoring data storage unit 121 using the model configuration data that are stored in the model configuration data storage unit 122 in the storage subsystem 108 of the software monitoring data management system 101 in order to generate prediction outputs that are transmitted to the client computing devices 102 via a frontend unit 112 of the software monitoring data management computing device 106.

The client computing devices 102, the software application monitoring computing devices 103, and the software monitoring data management computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Software Monitoring Data Management Computing Device

Figure 2:
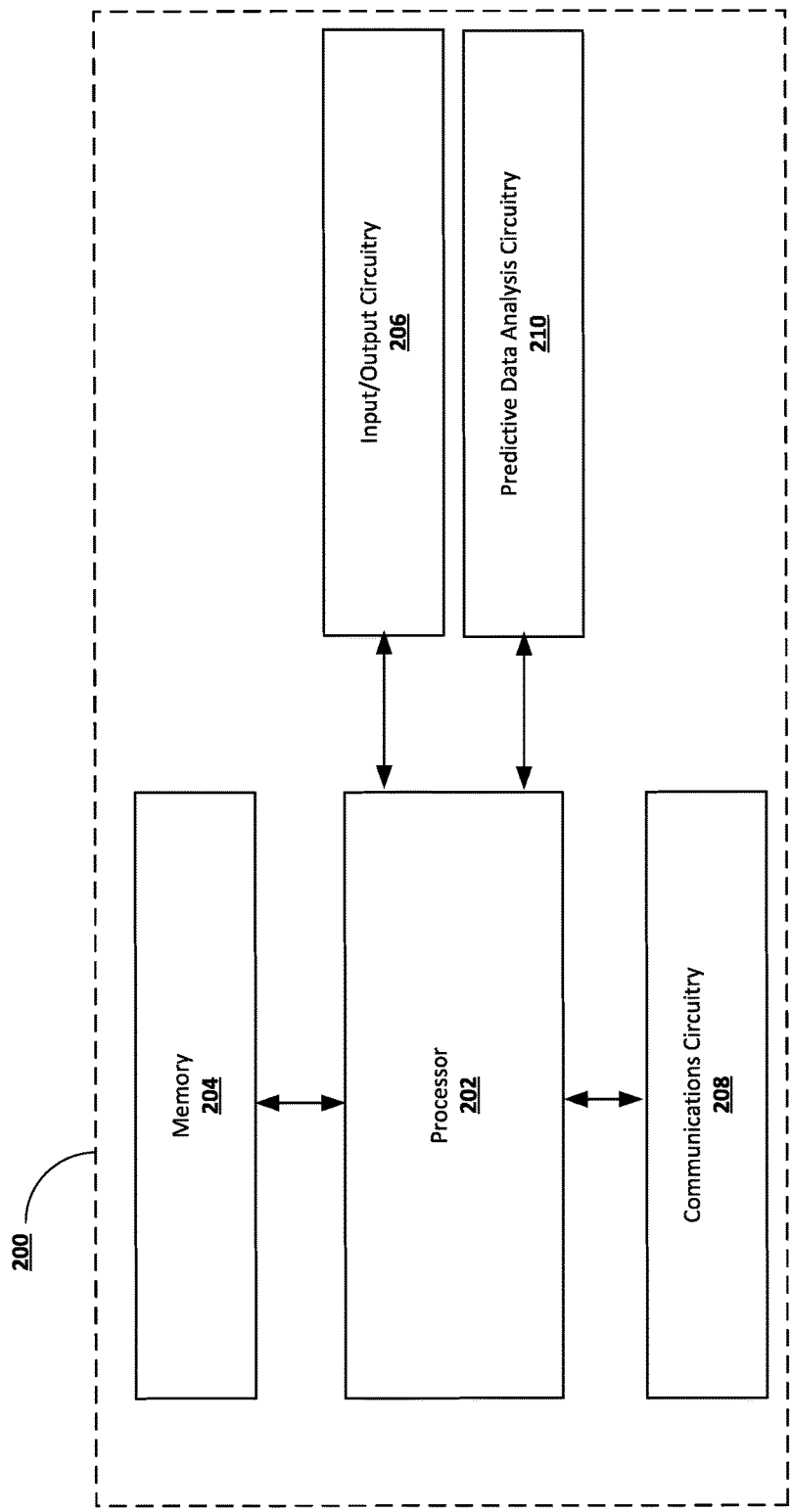
FIG. 2 is a block diagram of an example software monitoring data management computing device in accordance with at least some embodiments of the present invention.

The software monitoring data management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that are configured to perform machine learning operations in an expedited manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
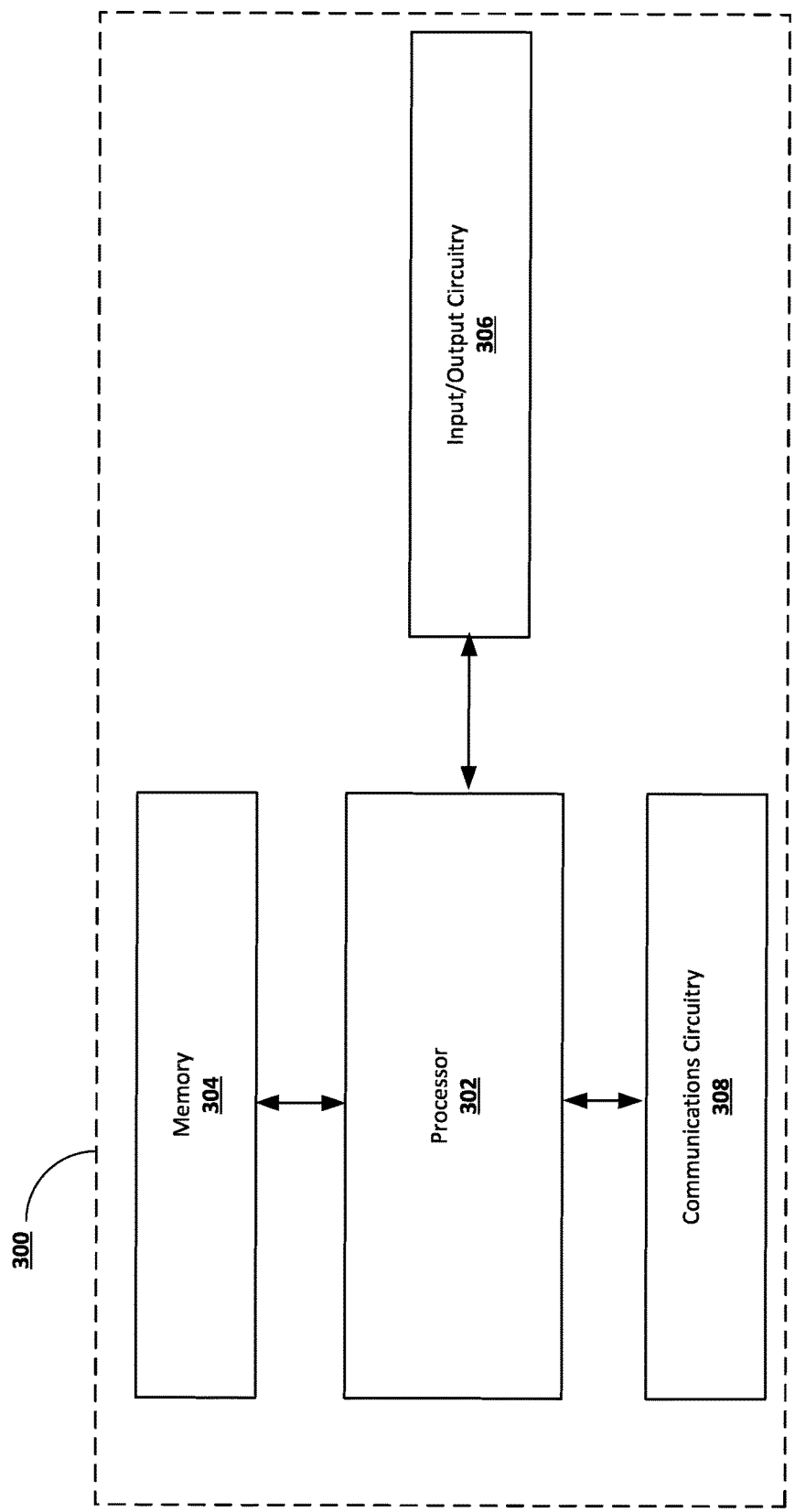
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Software Application Monitoring Computing Device

Figure 4:
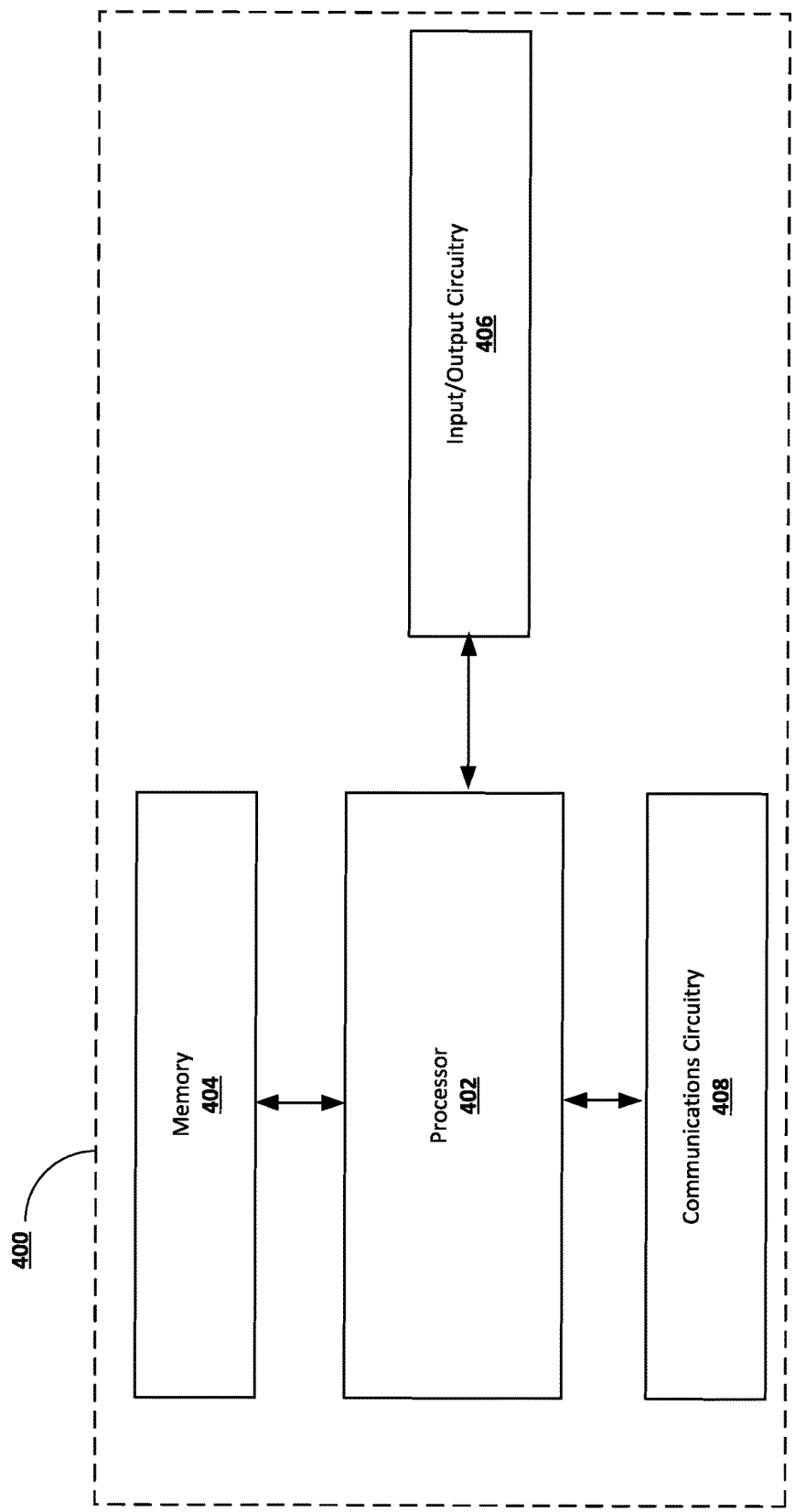
FIG. 4 is a block diagram of an example software application monitoring computing device in accordance with at least some embodiments of the present invention.

Referring now to FIG. 4, a software application monitoring computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

Provided below are exemplary server-side operations and client-side operations for performing server-side operations for proactive suspicious activity monitoring for a software application platform using an interactive software application platform monitoring dashboard. A person of ordinary skill in the relevant technology will recognize that the described server-side operations may be performed with different client-side operations for performing server-side operations for proactive suspicious activity monitoring for a software application platform using an interactive software application platform monitoring dashboard, and that the described client-side operations may be performed with different server-side operations for performing server-side operations for proactive suspicious activity monitoring for a software application platform using an interactive software application platform monitoring dashboard.

As described below, by proposing solutions for determining which suspicious activity alerts should be operationally prioritized, which suspicious activity alerts should be operationally deprioritized, and which suspicious activity alerts should be regarded as false positives, various embodiments of the present invention address technical problems associated with efficiently and reliably performing proactive monitoring of complex software application frameworks. In doing so, various embodiments of the present invention make important technical contributions to the fields of complex software application framework maintenance and complex software application framework security.

Exemplary Server-Side Operations

Figure 5:
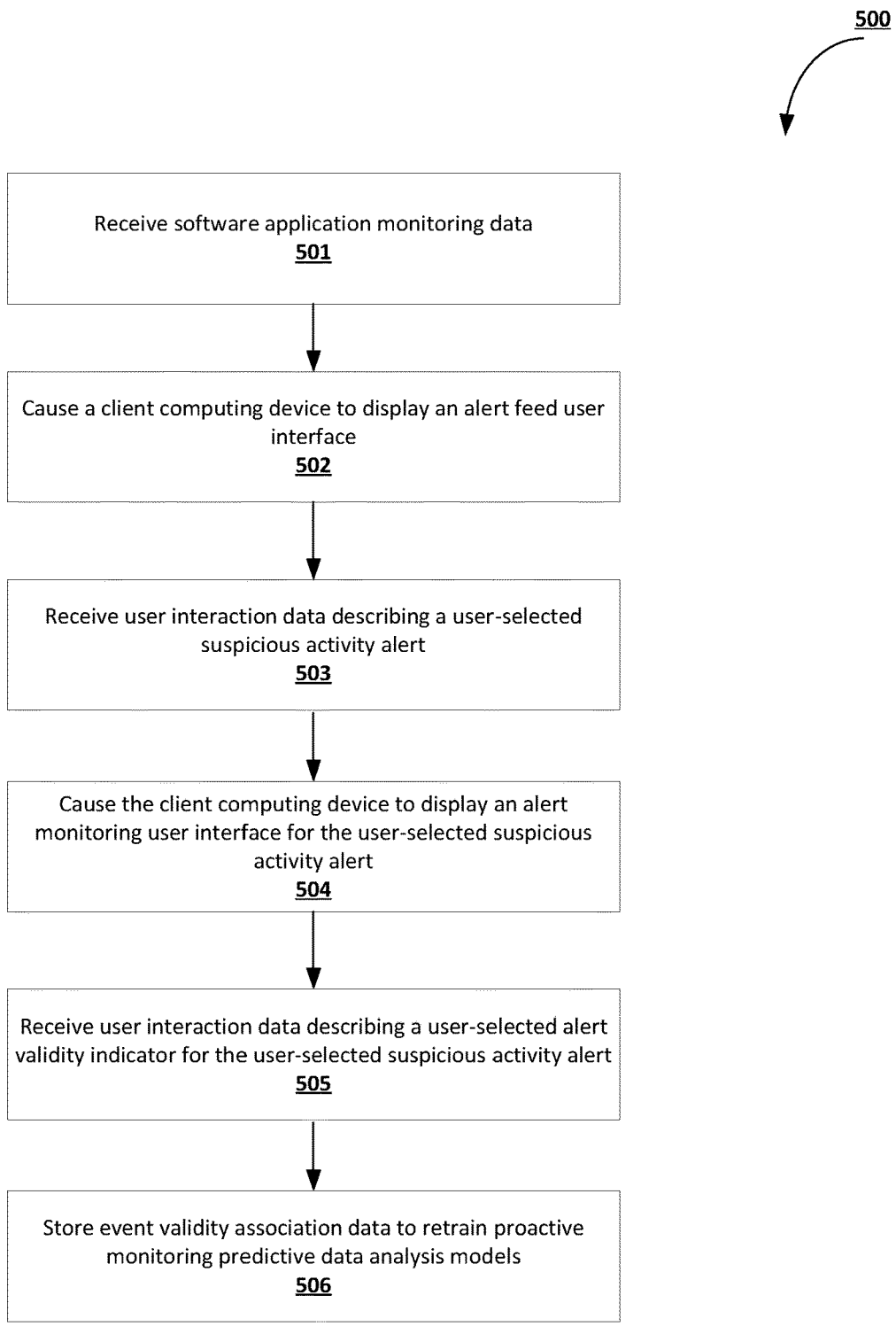
FIG. 5 is a flowchart diagram of an example process for performing server-side operations for proactive suspicious activity monitoring for a software application platform using an interactive software application platform monitoring dashboard in accordance with at least some embodiments of the present invention.

FIG. 5 is a flowchart diagram of an example process 500 for performing server-side operations for proactive suspicious activity monitoring for a software application platform using an interactive software application platform monitoring dashboard. Via the various operations of the process 500, the software monitoring data management computing device 106 can cause an interactive software application platform monitoring dashboard to be displayed to an end user of a client computing device 102, where the interactive software application platform monitoring dashboard comprises a set of user interfaces (e.g., an alert feed user interface, an alert monitoring user interface, and/or the like) that enable an end user to hierarchically view event monitoring metadata fields associated with each recorded suspicious activity alert of one or more recorded suspicious activity alerts of the software application platform, provide user-selected alert validity indicators for each recorded suspicious activity alert of the recorded suspicious activity alerts, and/or generate a suspicious activity monitoring workflow for each recorded suspicious activity alert of the recorded suspicious activity alerts.

The process 500 begins at operation 501 when the software monitoring data management computing device 106 receives software application platform monitoring data for a software application platform from a software application monitoring computing device 103. In some embodiments, the software application monitoring data describe one or more suspicious activity alerts for the software application platform. In some embodiments, the software application monitoring data describe one or more recorded activity events for the software application platform, and the software monitoring data management computing device 106 is configured to process each recorded activity event using a suspicious activity classification machine learning model to generate a suspicious activity likelihood prediction for the recorded activity event.

As described above, the software application monitoring data that is received at operation 401 may include at least one of recorded activity events and/or suspicious activity alerts. In some embodiments, a recorded activity event describes one or more event monitoring metadata fields associated with a recorded platform activity pattern that was recorded to have been performed by the software application platform in response to one or more activity requests by an end user while interacting with the software application platform. Examples of event monitoring metadata fields for a recorded activity event that is associated with a recorded platform activity pattern include an event monitoring metadata field describing a duration of the recorded platform activity pattern, an event monitoring metadata field describing a time of an initial detection of the recorded platform activity pattern, an event monitoring metadata field describing a time of a final/last detection of the recorded platform activity pattern, an event monitoring metadata field describing one or more user-provided input values that were provided by the end user to the software application framework as part of the activity requests by the end user, and an inferred suspicious activity likelihood weight for the recorded platform activity pattern that describes an inferred/computed likelihood that the recorded platform activity pattern is suspicious and/or is maintenance-critical (e.g., is security-critical). For example, when a recorded activity event describes a sensitive keyword search recorded platform activity pattern comprising one or more recorded keyword searches for sensitive keywords that are performed by a common user account, the event monitoring metadata fields for the noted recorded activity event may describe at least one of a duration of time within which the recorded keyword searches were performed, a recorded time of an initial recorded keyword search of the noted recorded keyword searches, a recorded time of a final recorded keyword search of the noted recorded keyword searches, the sensitive keywords, and the inferred suspicious activity likelihood weight for the noted recorded keyword searches. In some embodiments, suspicious keyword searches are the searches associated with designated suspicious terms/regular expressions (e.g., "API keys," "ARIs," "passwords," "shared secrets," and/or the like).

An operational example of a recorded activity event 600 is depicted in FIG. 5. As depicted in FIG. 5, the recorded activity event is associated with a set of recorded keyword searches for sensitive keywords that are performed by a common user account of a software application framework. As further depicted in FIG. 5, the event monitoring metadata fields for the recorded activity event 600 comprise the event monitoring metadata field 601 that describes the duration of the keyword searches, the event monitoring metadata field 602 that describes a recorded time of an initial recorded keyword search of the noted recorded keyword searches, the event monitoring metadata field 603 that describes a recorded time of a final recorded keyword search of the noted recorded keyword searches, the event monitoring metadata fields 604 that describe the sensitive keywords, and the event monitoring metadata field 605 that describes the inferred suspicious activity likelihood weight for the noted recorded keyword searches.

As described above, the software application monitoring data that is received at operation 401 may include at least one of recorded activity events and/or suspicious activity alerts. A suspicious activity alert is a recorded activity event that is designated/recorded to be describing/indicating a suspicious platform activity pattern, i.e., a platform activity pattern that was deemed maintenance-critical and/or security-critical for the software application platform. In some embodiments, all of the recorded activity patterns received from a software application monitoring computing device 103 for a software application platform are deemed maintenance-critical and/or security-critical for the software application platform. In some embodiments, each recorded activity pattern is associated with an event monitoring metadata field that describes an inferred suspicious activity likelihood weight for the platform activity pattern that is associated with the recorded activity pattern. In some of the noted embodiments, a recorded activity pattern is deemed maintenance-critical and/or security-critical if the noted event monitoring metadata field (i.e., the event monitoring metadata field that describes inferred suspicious activity likelihood weight for the platform activity pattern that is associated with the recorded activity pattern) satisfies (e.g., exceeds) a suspicious activity likelihood weight threshold value. In some embodiments, a recorded activity event is deemed to be a suspicious activity alert if a model output of a suspicious activity classification machine learning model that is generated via processing features associated with the recorded activity event describe that the recorded activity event is a suspicious activity alert. Exemplary architectures for suspicious activity classification machine learning models are described below.

In some embodiments, a suspicious activity classification machine learning model is a trained machine learning model that is configured to generate a model output via processing features relating to an input recorded activity event, where the model output can be used to infer/compute whether the input recorded activity event should be deemed a suspicious recorded activity event. In some embodiments, the features relating to an input recorded activity event include features extracted from the event monitoring metadata fields of the input recorded activity event, such as features provided by generating keyword embeddings for keywords described by the event monitoring metadata fields of an input recorded activity event that describes a recorded platform activity pattern comprising one or more recorded keyword searches for sensitive keywords that are performed by a common user account, features provided by generating time encodings of duration, initial detection time, and/or final detection time features of an input recorded activity event, and/or the like. In some embodiments, the model output of the suspicious activity classification machine learning model is determined based on an inferred suspicious activity likelihood weight for the platform activity pattern that is associated with the recorded activity which describes a likelihood that the platform activity pattern is suspicious. In some embodiments, the model output of the suspicious activity classification machine learning model is determined based on an indication of whether an inferred suspicious activity likelihood weight for the platform activity pattern that is associated with the recorded activity pattern satisfies (e.g., exceeds) a suspicious activity likelihood weight threshold value. In some embodiments, a suspicious activity classification machine learning model is a trained recurrent neural network machine learning model (e.g., a trained long-short term memory machine learning model) that is configured to process extracted features from sequentially-recorded activity requests of a common user profile with respect to a software application platform using a sequence of processing time steps for the trained recurrent neural network machine learning model. In some of the noted embodiments, each processing timestep generates a hidden state that can be used by a subsequent machine learning model (e.g., a set of fully connected layers) to determine whether the activity request associated with the processing timestep is part of an activity pattern having a particular activity type. While various embodiments of the present invention describe that the suspicious activity classification machine learning model is deployed on a server-side device, a person of ordinary skill in the relevant technology will recognize that in some embodiments the suspicious activity classification machine learning model may be deployed on a client-side device and/or on an intermediate server device.

In some embodiments, each recorded activity pattern may be associated with an activity type. The activity type of the recorded activity pattern describes a desired/expected output of the platform activity pattern that is associated with the recorded activity pattern. For example, a recorded activity pattern that includes one or more keyword searches each configured to retrieve search results for the input keywords (i.e., a suspicious keyword search activity event) may be associated with a suspicious keyword search activity event type. As another example, a recorded activity pattern that includes receiving one or more spam emails from the same recipient profile and/or within a defined time window having a defined time window size (i.e., a spam email receipt activity event) may be associated with a spam email receipt activity event type. In some embodiments, a suspicious activity classification machine learning model is configured to generate an activity type for each recorded suspicious activity alert. For example, the suspicious activity classification machine learning model may be configured to generate n inferred suspicious activity likelihood weights for a recorded activity event, where each inferred suspicious activity likelihood weight describes a likelihood that the recorded activity event is associated with an activity type of n activity types.

In some embodiments, each suspicious activity alert is selected from a suspicious activity alert taxonomy, e.g., a suspicious activity alert taxonomy comprising MITRE's ATT&CK taxonomy (https://attack.mitre.org/) MITRE's D3FEND taxonomy (https://d3fend.mitre.org), as well as a taxonomy comprising credential stuffing alerts, high volume account deletion alerts, high traffic alerts, suspicious search alerts, content scraping alerts, customer internal instance external access alerts, anomalous internet protocol address login alerts, exit node login alerts, login from concurrent location alerts, rapid multi-factor authentication token rotation alerts, secret upload alerts, high volume content export alerts, high volume of content made public alerts, high volume of code commit alerts, high volume of third party app installation alerts, high volume of third party application programming interface access alerts, mass spam/abusive email transmission alerts, urgent change alerts, high volume of email address change alerts, and/or the like.

In some embodiments, the software application platform monitoring data for a software application platform can be used to: (i) detect/identify one or more recorded activity events for the software application framework, and (ii) process the one or more recorded activity events to generate one or more suspicious activity alerts. The noted set of operations may in some embodiments be performed in accordance with the process 1100 that is depicted in FIG. 11. As depicted in FIG. 11, the depicted process 1100 begins at the ingestion phase 1101 where the recorded activity events are received. In some embodiments, the ingestion phase 1101 is performed using data provided by an event bus that combines events from a set of sources and presents the events using a defined schema. Examples of event sources include a data lake, a permissions service, and one or more user activity logs.

The process 1100 continues at the analysis phase 1102 where the recorded activity events are processed using the suspicious activity detection machine learning model to generate suspicious activity alerts. The suspicious activity detection machine learning model may use one or more machine learning sub-models, such as one or more thresholding-based sub-models, one or more clustering sub-models, and/or one or more classification machine learning models. In some embodiments, the suspicious activity detection machine learning model is provided using one or more cloud application deployment platforms, such as using the Amazon Web Services Forge platform.

The process 1100 continues at the representation phase 1103 when the suspicious activity alerts are presented to an end user via one or more presentation techniques. Examples of presentation techniques include one or more application programming interfaces, one or more webhooks, one or more Security Information and Event Management (SIEM) platforms, one or more frontend user interfaces, and/or the like.

At operation 502, the software monitoring data management computing device 106 causes the client computing device to present an alert feed user interface. The alert feed user interface may describe a set of suspicious activity alerts that are associated with the software application platform in a temporally-ordered manner, along with a top-level subset of the event monitoring metadata fields for each suspicious activity alert. In some embodiments, the alert feed user interface is configured to present, for each suspicious activity alert having a set of event monitoring metadata fields, only those event monitoring metadata fields that are deemed to be hierarchically superior to other event monitoring metadata fields of the suspicious activity alert. In some embodiments, the software monitoring data management computing device 106 generates alert feed user interface data (e.g., HTML data) for the alert feed user interface and provides the alert feed user interface data to a client computing device 102, where the client computing device 102 is configured to generate the alert feed user interface based on the alert feed user interface data and present/display the alert feed user interface to an end user of the client computing device 102.

In some embodiments, event monitoring metadata fields for a suspicious activity alert include a set of top-level event monitoring metadata fields that are designated by system configuration data for the software monitoring data management system 101 to be semantically more pertinent to identification of the suspicious activity alert, as well as a set of bottom-level event monitoring metadata fields that are designated by the system configuration data for the software monitoring data management system 101 to be semantically less pertinent to identification of the suspicious activity alert compared to the noted top-level event monitoring metadata fields. Examples of top-level event monitoring metadata fields for a suspicious activity alert include metadata fields that describe at least one of an activity type for the suspicious activity alert, a textual description for the suspicious activity alert, a user-selected status classification for the suspicious activity alert, an administrator user profile that is assigned to the suspicious activity alert, and a creation date of the suspicious activity alert. Examples of low-level event monitoring metadata fields for a suspicious activity alert include metadata fields that describe at least one of a computed/inferred remaining time measure for addressing the suspicious activity alert, a computed/inferred priority level for the suspicious activity alert, one or more classification explanatory features, and/or the like.

An operational example of an alert feed user interface 700 is depicted in FIG. 7. As depicted in FIG. 7, the alert feed user interface 700 depicts a set of suspicious activity alerts, such as the suspicious activity alert 701 that is associated with a metadata field 711 that describes the activity type of the suspicious activity alert as "Suspicious Search", the metadata field 712 that describes a textual description of the suspicious activity alert, the metadata field 713 that describes a user-selected status classification for the suspicious activity alert, and the metadata field 714 that describes a creation date for the suspicious activity alert. As further depicted in FIG. 7, the alert feed user interface 700 further enables bookmarking each depicted suspicious activity alert (e.g., using the button 721 for the suspicious activity alert 701) and performing a set of actions (e.g., by interacting with the button 722 for the suspicious activity alert 701, which may lead to displaying a dropdown menu depicting selections for potential actions). Examples of actions include password resets, user account lockouts (e.g., for a defined time period), rate limit impositions, and confirmations of user authenticity (e.g., via email confirmation, social media account confirmation, and/or the like). As further depicted in FIG. 7, the alert feed user interface 700 further enables searching through the suspicious activity alerts using text queries provided using the user interface element 731, based on top-level metadata fields that are specified using the user interface element 732, and by utilizing status filtering via a user-selected status classification filter that is provided using the interface element 733.

At operation 503, the software monitoring data management computing device 106 receives user interaction data describing user interaction with the alert feed user interface, where the user interaction data originates from the client computing device 102, and where the user interaction describes a user-selected suspicious activity alert. An alert feed user interface can be used by an end user of a client computing device 102 to select a user-selected suspicious activity alert via interacting (e.g., clicking on, touching on, and/or the like) the depicted indication of a particular suspicious activity alert as depicted by the alert feed user interface. For example, within the alert feed user interface 700 of FIG. 7, user interaction with at least one of the top-level event monitoring metadata fields of the suspicious activity alert 701 may cause designating the suspicious activity alert 701 as the user-selected suspicious activity alert, which may in turn lead to display/presentation of an alert monitoring user interface for the suspicious activity alert 701 by the client computing device 102, as further described below. In some embodiments, the user-selected suspicious activity alert is selected by the end user from a plurality of recorded suspicious activity alerts, and identifying the user-selected suspicious activity alert comprises generating alert monitoring user interface data for an event feedback user interface that is configured to display the plurality of recorded suspicious activity alerts and enable the end user to select the user-selected suspicious activity alert from the plurality of recorded suspicious activity alerts.

At operation 504, the software monitoring data management computing device 106 causes the client computing device 102 to display an alert monitoring user interface for the user-selected suspicious activity alert, where the alert monitoring user interface displays a set of event monitoring metadata fields for the user-selected suspicious activity alert that include at least one bottom-level event monitoring metadata fields for the user-selected suspicious activity alert. In some embodiments, the alert monitoring user interface is configured to display one or more event monitoring metadata fields associated with the user-selected suspicious activity alert and enable user selection of a user-selected alert validity indicator for the user-selected suspicious activity alert. In some embodiments, the software monitoring data management computing device 106 generates alert feed user interface data (e.g., HTML data) for the alert monitoring user interface and provides the alert monitoring user interface data to a client computing device 102, where the client computing device 102 is configured to generate the alert monitoring user interface based on the alert monitoring user interface data and present/display the alert monitoring user interface to an end user of the client computing device 102.

Examples of metadata fields that may be displayed by an alert monitoring user interface may include a recorded activity performance frequency for the user-selected suspicious activity alert within a designated time period. The recorded activity performance frequency may describe a count and/or a per-time-unit (e.g., a per-minute) count of detection of activity requests associated with the corresponding suspicious activity pattern within a designated time period (e.g., a period within which the activity requests were detected, a defined time window such as two-hour time window, and/or the like).

Other examples of metadata fields that may be displayed by an alert monitoring user interface may include a recorded activity performance ratio for the user-selected suspicious activity alert with respect to a plurality of recorded activities having an activity type of the user-selected suspicious activity alert. The recorded activity performance may describe a ratio of suspicious activity patterns within all of the recorded activity patterns having a particular activity type. For example, the recorded activity performance may describe how many percentage of keyword searches by a particular user profile within a designated time period used suspicious keywords, how many percentage of emails received from a particular recipient profile within a designated time period were predicted/indicated by the user to be spam emails, and/or the like.

Other examples of metadata fields that may be displayed by an alert monitoring user interface may include one or more classification explanatory features for the user-selected suspicious activity alert. A classification explanatory feature may be any feature that is designated/recorded as being significant to a classification of a suspicious activity alert as being maintenance-critical and/or security-critical. In some embodiments, when classification of a recorded activity event as being maintenance-critical and/or security-critical is performed by a the suspicious activity classification machine learning model based on one or more event features of the recorded activity event, the classification explanatory feature include those features that have a parameter value assigned to them by the suspicious activity classification machine learning model (e.g., by an input layer of the suspicious activity classification machine learning model) that satisfies (e.g., exceeds) a parameter value threshold for the suspicious activity classification machine learning model. In some embodiments, each recorded suspicious activity alert is associated with one or more classification explanatory features that are determined based on one or more model parameters of the suspicious activity classification machine learning model, and the one or more metadata fields for the user-selected suspicious activity alert comprise the one or more classification explanatory features for the user-selected suspicious activity alert. Examples of one or more classification explanatory features are features that describe at least one of recorded activity performance frequencies and recorded activity performance ratios.

An operational example of an alert monitoring user interface 800 is depicted in FIG. 8. As depicted in FIG. 8, the alert monitoring user interface 800 (which is associated with the suspicious activity alert 701 of FIG. 7 that is here the user-selected suspicious activity alert) provides the following metadata fields for the user-selected suspicious activity alert: the metadata field 712 that describes the textual description of the user-selected suspicious activity alert, the metadata field 801 that describes an account name of the user-selected suspicious activity alert, the metadata field 802 that describes a recorded activity performance frequency for the user-selected suspicious activity alert, the metadata field 803 that describes a recorded activity performance ratio for the user-selected suspicious activity alert, the metadata field 713 that describes the user-selected status classification for the user-selected suspicious activity alert (by using a user interface element that also enables changing the user-selected status classification for the user-selected suspicious activity alert), the metadata field 806 that describes a computed/inferred priority value for the user-selected suspicious activity alert, the metadata field 804 that describes a computed/inferred remaining time measure for the user-selected suspicious activity alert, and the metadata field 805 that describes an assigned administrator profile set for the user-selected suspicious activity alert.

As further depicted in FIG. 8, the alert monitoring user interface 800 enables adding comments for the alert monitoring user interface 800 using the panel 811, attach files related to the alert monitoring user interface 800 using the button 812, generate a suspicious activity monitoring workflow for the user-selected suspicious activity alert and assign one or more administrator user profiles to the suspicious activity monitoring workflow via the button 814, and/or the like.

As described above, in some embodiments, an alert monitoring user interface enables an end user to select a user-selected alert validity indicator for the user-selected suspicious activity alert. A user-selected alert validity indicator is a user-selected value that may serve as a ground-truth measure of whether the end user regards a suspicious activity alert as being properly categorized as being maintenance-critical and/or security-critical. In some embodiments, an alert monitoring user interface is configured to display one or more event metadata fields associated with the user-selected suspicious activity alert and enable user selection of a user-selected alert validity indicator for the user-selected suspicious activity alert. For example, as depicted in FIG. 8, the alert monitoring user interface 800 that is associated with the suspicious activity alert 701 enables the end user to designate the suspicious activity alert 701 as having an affirmative user-selected alert validity indicator by using the user interface element 851. As another example, as depicted in FIG. 8, the alert monitoring user interface 800 that is associated with the suspicious activity alert 701 enables the end user to designate the suspicious activity alert 701 as having a negative user-selected alert validity indicator by using the user interface element 852. In some embodiments, the user-selected alert validity indicators for suspicious activity alerts can be used by a training engine to further train one or more proactive suspicious activity monitoring predictive data analysis models (e.g., the suspicious activity classification machine learning model).

At operation 505, the software monitoring data management computing device 106 receives user interaction data with the user monitoring user interface data describing the user-selected alert validity indicator and, at operation 506, stores the event validity association data describing an association of the one or more event metadata fields and the user-selected suspicious activity alert in a storage framework (e.g., the storage subsystem 108). In some embodiments, the event validity association data describing that the one or more event metadata fields are associated with the user-selected suspicious activity alert. For example, the event validity association data may describe that a particular set of event metadata fields are associated with an affirmative user-selected suspicious activity alert. In some embodiments, the event validity association data is configured to be used to train one or more proactive suspicious activity monitoring predictive data analysis models associated with the software application framework. In some embodiments, the one or more proactive suspicious activity monitoring predictive data analysis models are configured to generate a suspicious activity prediction for each input suspicious activity alert having an activity type of the user-selected suspicious activity alert.

Accordingly, in some embodiments, the software monitoring data management computing device 106 is configured to generate and maintain a suspicious activity classification machine learning model 1002, in accordance with the process 1000 that is depicted in FIG. 10. The process that is depicted in FIG. 10 begins when the software monitoring data management computing device 106 receives recorded activity events 1001, which can then be supplied as an input to a suspicious activity classification machine learning model 1002 in order to generate suspicious activity alerts 1003 based on the output of the suspicious activity classification machine learning model 1002. Once generated, the suspicious activity alerts 1003 can be displayed to an end user via an alert feed user interfaces 1004 and a set of alert monitoring user interfaces 1005. The alert monitoring user interfaces 1005 can enable the end user to provide user-selected alert validity indicators 1011 for the suspicious activity alerts 1003, where the user-selected alert validity indicators 1011 can be used as training data to further train/refine the suspicious activity classification machine learning model 1002.

In some embodiments, a suspicious activity classification machine learning model is configured to detect suspicious activity alerts based on recorded activity events across various platforms of a customer identifier and combine the noted detected suspicious activity alerts to generate a cross-platform suspicious activity signature for the customer identifier. For example, based on a first suspicious activity alerts describe suspicious keyword searches in the documentation repository of a customer identifier and suspicious attempts to access internal instances of the customer identifier, a system may generate a cross-platform suspicious activity signature describing an attempt to sabotage key software application services of the customer identifier. In some embodiments, detected suspicious activity alerts may be used to perform automated responsive actions, such as automated account locks for defined time periods and/or automated password changes.

Exemplary Client-Side Operations

FIG. 9 is a flowchart diagram of an example process 900 for performing client-side operations for proactive suspicious activity monitoring for a software application platform using an interactive software application platform monitoring dashboard. Via the various operations of the process 900, a client computing device 102 displays an interactive software application platform monitoring dashboard to an end user of the client computing device 102, where the interactive software application platform monitoring dashboard comprises a set of user interfaces (e.g., an alert feed user interface, an alert monitoring user interface, and/or the like) that enable an end user to hierarchically view event monitoring metadata fields associated with each recorded suspicious activity alert of one or more recorded suspicious activity alerts of the software application platform, provide user-selected alert validity indicators for each recorded suspicious activity alert of the recorded suspicious activity alerts, and/or generate a suspicious activity monitoring workflow for each recorded suspicious activity alert of the recorded suspicious activity alerts.

The process 900 begins at operation 901 when the client computing device receives a user request to view an alert feed user interface. In response, at operation 902, the client computing device 102 provides a request to the frontend unit 112 of the software monitoring data management computing device 106 to obtain alert feed user interface data for the alert feed user interface, which the client computing device 102 receives at operation 903. Then, at operation 904, the client computing device 102 displays the alert feed user interface based on the alert feed user interface data.

In some embodiments, the alert feed user interface is configured to present, for each suspicious activity alert having a set of event monitoring metadata fields, only those event monitoring metadata fields that are deemed to be hierarchically superior to other event monitoring metadata fields of the suspicious activity alert. In some embodiments, the software monitoring data management computing device 106 generates alert feed user interface data (e.g., HTML, data) for the alert feed user interface and provides the alert feed user interface data to a client computing device 102, where the client computing device 102 is configured to generate the alert feed user interface based on the alert feed user interface data and present/display the alert feed user interface to an end user of the client computing device 102.

At operation 905, the client computing device 102 identifies a user-selected suspicious activity alert based on user interaction data with the alert feed user interface that describes user selection of a recorded suspicious activity alert that is depicted by the alert feed user interface. Then, at operation 906, the client computing device 102 provides an indication of the user-selected suspicious activity alert to a software monitoring data management computing device 106. In response, at operation 907, the client computing device 102 receives alert monitoring user interface data for an alert monitoring user interface that is associated with the user-selected suspicious activity alert from the software monitoring data management computing device 106 and, at operation 908, presents the alert monitoring user interface based on the received alert monitoring user interface data.

In some embodiments, the alert monitoring user interface is configured to display one or more event monitoring metadata fields associated with the user-selected suspicious activity alert and enable user selection of a user-selected alert validity indicator for the user-selected suspicious activity alert. In some embodiments, the software monitoring data management computing device 106 generates alert feed user interface data (e.g., HTML data) for the alert monitoring user interface and provides the alert monitoring user interface data to a client computing device 102, where the client computing device 102 is configured to generate the alert monitoring user interface based on the alert monitoring user interface data and present/display the alert monitoring user interface to an end user of the client computing device 102.

At operation 908, the client computing device 102 detects user interaction data with the user monitoring user interface that describes a user-selected validity indicator for the user-selected suspicious activity alert. At operation 910, the client computing device 102 transmits the user-selected validity indicator for the user-selected suspicious activity alert to the software monitoring data management computing device 106.

As described above, in some embodiments, an alert monitoring user interface enables an end user to select a user-selected alert validity indicator for the user-selected suspicious activity alert. A user-selected alert validity indicator is a user-selected value that may serve as a ground-truth measure of whether the end user regards a suspicious activity alert as being properly categorized as being maintenance-critical and/or security-critical. In some embodiments, an alert monitoring user interface is configured to display one or more event metadata fields associated with the user-selected suspicious activity alert and enable user selection of a user-selected alert validity indicator for the user-selected suspicious activity alert.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer program product for performing proactive suspicious activity monitoring for a software application framework, the computer program product comprising at least one non-transitory computer-readable storage medium having computer-readable program code portions stored therein, the computer-readable program code portions configured to:
   access alert feed data associated with a software monitoring management system, wherein the alert feed data comprises at least one or more portions of data related to one or more recorded suspicious activity alerts, wherein the one or more recorded suspicious activity alerts have been classified by a proactive suspicious activity monitoring predictive data analysis model associated with the software monitoring management system, and wherein the one or more recorded suspicious activity alerts are associated with a respective platform activity pattern, and wherein the respective platform activity pattern is used to determine a respective activity type of the one or more recorded suspicious activity alerts;

render, on an interactive software application platform monitoring dashboard, an alert feed user interface, wherein the alert feed user interface is based at least in part on the alert feed data, and wherein the alert feed user interface comprises one or more interactive interface elements associated with the one or more recorded suspicious activity alerts;

access, in response to an identification of a user-selected suspicious activity alert corresponding to a respective recorded suspicious activity alert of the one or more recorded suspicious activity alerts rendered via the alert feed user interface, alert monitoring data;

render, on the interactive software application platform monitoring dashboard, an alert monitoring user interface, wherein the alert monitoring user interface is based at least in part on the alert monitoring data, and wherein the alert monitoring user interface comprises one or more interactive interface elements associated with the user-selected suspicious activity alert;

generate, in response to an interaction with the one or more interactive interface elements associated with the user-selected suspicious activity alert, a user-selected alert validity indication, wherein the user-selected alert validity indication indicates whether the user-selected suspicious activity alert has been properly classified by the proactive suspicious activity monitoring predictive data analysis model associated with the software monitoring management system.

2. The computer program product of claim 1, wherein each of the one or more recorded suspicious activity alerts is associated with one or more classification explanatory features that are determined based on one or more model parameters of the proactive suspicious activity monitoring predictive data analysis model, and the one or more interactive interface elements associated with the user-selected suspicious activity alert comprise the one or more classification explanatory features for the user-selected suspicious activity alert.

3. The computer program product of claim 1, wherein the user-selected alert validity indication comprises one of an affirmative user-selected alert validation or a negative user-selected alert validation associated with the user-selected suspicious activity alert, and wherein alert validity association data comprising one or more user-selected alert validity indications can be used to train one or more proactive suspicious activity monitoring predictive data analysis models.

4. The computer program product of claim 1, wherein the user-selected alert validity indication comprises one of an affirmative user-selected alert validation or a negative user-selected alert validation associated with the user-selected suspicious activity alert, and wherein alert validity association data comprising one or more user-selected alert validity indications can be used to iteratively retrain one or more existing proactive suspicious activity monitoring predictive data analysis models.

5. The computer program product of claim 1, wherein the computer-readable program code portions are further configured to:

execute, via an interaction with the alert feed user interface, one or more user account actions related to a respective user account associated with the one or more recorded suspicious activity alerts, wherein the one or more user account actions comprise at least one of a user account password reset action, a user account lockout action, a user account request rate limiting action, or a user authenticity confirmation action.

6. The computer program product of claim 1, wherein the proactive suspicious activity monitoring predictive data analysis model is further configured to:

detect one or more suspicious activity alerts based on one or more recorded suspicious activity events across various software platforms associated with a user account; and generate, based on the one or more suspicious activity alerts, a cross-platform suspicious activity signature for the user account.

7. The computer program product of claim 1, wherein the activity type of the one or more recorded suspicious activity alerts is at least one of a suspicious keyword search activity event type or a spam email receipt activity event type.

8. A computer-implemented method, the method comprising:

accessing alert feed data associated with a software monitoring management system, wherein the alert feed data comprises at least one or more portions of data related to one or more recorded suspicious activity alerts, wherein the one or more recorded suspicious activity alerts have been classified by a proactive suspicious activity monitoring predictive data analysis model associated with the software monitoring management system, and wherein the one or more recorded suspicious activity alerts are associated with a respective platform activity pattern, and wherein the respective platform activity pattern is used to determine a respective activity type of the one or more recorded suspicious activity alerts;

rendering, on an interactive software application platform monitoring dashboard, an alert feed user interface, wherein the alert feed user interface is based at least in part on the alert feed data, and wherein the alert feed user interface comprises one or more interactive interface elements associated with the one or more recorded suspicious activity alerts;

accessing, in response to an identification of a user-selected suspicious activity alert corresponding to a respective recorded suspicious activity alert of the one or more recorded suspicious activity alerts rendered via the alert feed user interface, alert monitoring data;

rendering, on the interactive software application platform monitoring dashboard, an alert monitoring user interface, wherein the alert monitoring user interface is based at least in part on the alert monitoring data, and wherein the alert monitoring user interface comprises one or more interactive interface elements associated with the user-selected suspicious activity alert;

generating, in response to an interaction with the one or more interactive interface elements associated with the user-selected suspicious activity alert, a user-selected alert validity indication, wherein the user-selected alert validity indication indicates whether the user-selected suspicious activity alert has been properly classified by the proactive suspicious activity monitoring predictive data analysis model associated with the software monitoring management system.

9. The computer-implemented method of claim 8, wherein each of the one or more recorded suspicious activity alerts is associated with one or more classification explanatory features that are determined based on one or more model parameters of the proactive suspicious activity monitoring predictive data analysis model, and the one or more interactive interface elements associated with the user-selected suspicious activity alert comprise the one or more classification explanatory features for the user-selected suspicious activity alert.

10. The computer-implemented method of claim 8, wherein the user-selected alert validity indication comprises one of an affirmative user-selected alert validation or a negative user-selected alert validation associated with the user-selected suspicious activity alert, and wherein alert validity association data comprising one or more user-selected alert validity indications can be used to train one or more proactive suspicious activity monitoring predictive data analysis models.

11. The computer-implemented method of claim 8, wherein the user-selected alert validity indication comprises one of an affirmative user-selected alert validation or a negative user-selected alert validation associated with the user-selected suspicious activity alert, and wherein alert validity association data comprising one or more user-selected alert validity indications can be used to iteratively retrain one or more existing proactive suspicious activity monitoring predictive data analysis models.

12. The computer-implemented method of claim 8, the method further comprising:
    executing, via an interaction with the alert feed user interface, one or more user account actions related to a respective user account associated with the one or more recorded suspicious activity alerts, wherein the one or more user account actions comprise at least one of a user account password reset action, a user account lockout action, a user account request rate limiting action, or a user authenticity confirmation action.

13. The computer-implemented method of claim 8, wherein the proactive suspicious activity monitoring predictive data analysis model is further configured to:
    detect one or more suspicious activity alerts based on one or more recorded suspicious activity events across various software platforms associated with a user account; and
    generate, based on the one or more suspicious activity alerts, a cross-platform suspicious activity signature for the user account.

14. The computer-implemented method of claim 8, wherein the activity type of the one or more recorded suspicious activity alerts is at least one of a suspicious keyword search activity event type or a spam email receipt activity event type.

15. One or more non-transitory computer-readable media having encoded thereon one or more computer-executable instructions that, when executed on a computer, cause the computer to:
    access alert feed data associated with a software monitoring management system, wherein the alert feed data comprises at least one or more portions of data related to one or more recorded suspicious activity alerts, wherein the one or more recorded suspicious activity alerts have been classified by a proactive suspicious activity monitoring predictive data analysis model associated with the software monitoring management system, and wherein the one or more recorded suspicious activity alerts are associated with a respective platform activity pattern, and wherein the respective platform activity pattern is used to determine a respective activity type of the one or more recorded suspicious activity alerts;
    render, on an interactive software application platform monitoring dashboard, an alert feed user interface, wherein the alert feed user interface is based at least in part on the alert feed data, and wherein the alert feed user interface comprises one or more interactive interface elements associated with the one or more recorded suspicious activity alerts;
    access, in response to an identification of a user-selected suspicious activity alert corresponding to a respective recorded suspicious activity alert of the one or more recorded suspicious activity alerts rendered via the alert feed user interface, alert monitoring data;
    render, on the interactive software application platform monitoring dashboard, an alert monitoring user interface, wherein the alert monitoring user interface is based at least in part on the alert monitoring data, and wherein the alert monitoring user interface comprises one or more interactive interface elements associated with the user-selected suspicious activity alert;
    generate, in response to an interaction with the one or more interactive interface elements associated with the user-selected suspicious activity alert, a user-selected alert validity indication, wherein the user-selected alert validity indication indicates whether the user-selected suspicious activity alert has been properly classified by the proactive suspicious activity monitoring predictive data analysis model associated with the software monitoring management system.

16. The one or more non-transitory computer-readable media of claim 15, wherein the one or more computer-executable instructions further cause the computer to:
    execute, via an interaction with the alert feed user interface, one or more user account actions related to a respective user account associated with the one or more recorded suspicious activity alerts, wherein the one or more user account actions comprise at least one of a user account password reset action, a user account lockout action, a user account request rate limiting action, or a user authenticity confirmation action.

17. The one or more non-transitory computer-readable media of claim 15, wherein the proactive suspicious activity monitoring predictive data analysis model is further configured to:
    detect one or more suspicious activity alerts based on one or more recorded suspicious activity events across various software platforms associated with a user account; and
    generate, based on the one or more suspicious activity alerts, a cross-platform suspicious activity signature for the user account.

\* \* \* \* \*